(12) United States Patent  (10) Patent No.: US 8,462,165 B1
Han et al.  (45) Date of Patent: Jun. 11, 2013

(54) SYSTEM, METHOD, AND COMPUTER PROGRAM PRODUCT FOR VOICE CONTROL OF A GRAPHICS HARDWARE PROCESSOR

(75) Inventors: Gang Han, San Jose, CA (US); Terence D. Blanchard, San Jose, CA (US); Richard L. Clark, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1176 days.

(21) Appl. No.: 11/688,177

(22) Filed: Mar. 19, 2007

(51) Int. Cl.
  *G06F 13/14* (2006.01)
(52) U.S. Cl.
  USPC .......................................... 345/520
(58) Field of Classification Search
  USPC .................. 345/501, 520; 715/728
  See application file for complete search history.

(56) References Cited

U.S. PATENT DOCUMENTS

| | | | |
|---|---|---|---|
| 5,600,765 A * | 2/1997 | Ando et al. | 345/668 |
| 6,115,026 A * | 9/2000 | Spurlock | 345/24 |
| 6,169,552 B1 * | 1/2001 | Endo et al. | 345/427 |
| 6,718,308 B1 * | 4/2004 | Nolting | 704/275 |
| 2003/0054881 A1 * | 3/2003 | Hedrick et al. | 463/29 |
| 2003/0103085 A1 * | 6/2003 | Anuszewski et al. | 345/810 |
| 2003/0156130 A1 * | 8/2003 | James et al. | 345/728 |
| 2003/0167155 A1 * | 9/2003 | Reghetti | 703/1 |
| 2004/0246256 A1 * | 12/2004 | Parakkuth et al. | 345/501 |
| 2005/0038986 A1 * | 2/2005 | Agan et al. | 713/2 |
| 2005/0177359 A1 * | 8/2005 | Lu et al. | 704/200 |
| 2005/0237326 A1 * | 10/2005 | Kuhne | 345/506 |
| 2006/0170689 A1 * | 8/2006 | Maier et al. | 345/501 |

* cited by examiner

*Primary Examiner* — Edward Martello
(74) *Attorney, Agent, or Firm* — Zilka-Kotab, PC (57) ABSTRACT

A system, method, and computer program product are provided for controlling at least one aspect of a graphics hardware processor, in response to a command that is prompted by a vocal utterance.

28 Claims, 8 Drawing Sheets

SYSTEM, METHOD, AND COMPUTER PROGRAM PRODUCT FOR VOICE CONTROL OF A GRAPHICS HARDWARE PROCESSOR

FIELD OF THE INVENTION

The present invention relates to voice control systems, and more particularly to controlling various aspects of a system using vocal utterances.

BACKGROUND

In the prior art, graphics hardware processors are typically controlled utilizing a visual graphics user interface (GUI). Using such GUI, a user is capable of providing various tactile input (e.g. keyboard/mouse input, etc.) for the purpose of controlling different aspects of the graphics hardware processor. Such aspects range from changing a resolution of a display under the control of the graphics hardware processor to adjusting color quality supported by the graphics hardware processor, etc.

By requiring an interaction with such a GUI, a user must be familiar with such interface as well as provide substantial tactile input. While this is acceptable in certain circumstance, it may lead to complications in some scenarios. Just by way of example, a user may have limited or restricted access to a keyboard and/or mouse. Further, the user may not be familiar with the GUI or the mechanism for accessing the same. Still yet, in a situation where a display "blacks out," it may be difficult to access the GUI for the purpose of effectively addressing such situation. Even still, multi-display environments may require frequent adjustment, etc., which would, in turn, require recurrent GUI access.

There is thus a need for addressing these and/or other issues associated with the prior art.

SUMMARY

A system, method, and computer program product are provided for controlling at least one aspect of a graphics hardware processor, in response to a command that is prompted by a vocal utterance.

DETAILED DESCRIPTION

Figure 1:
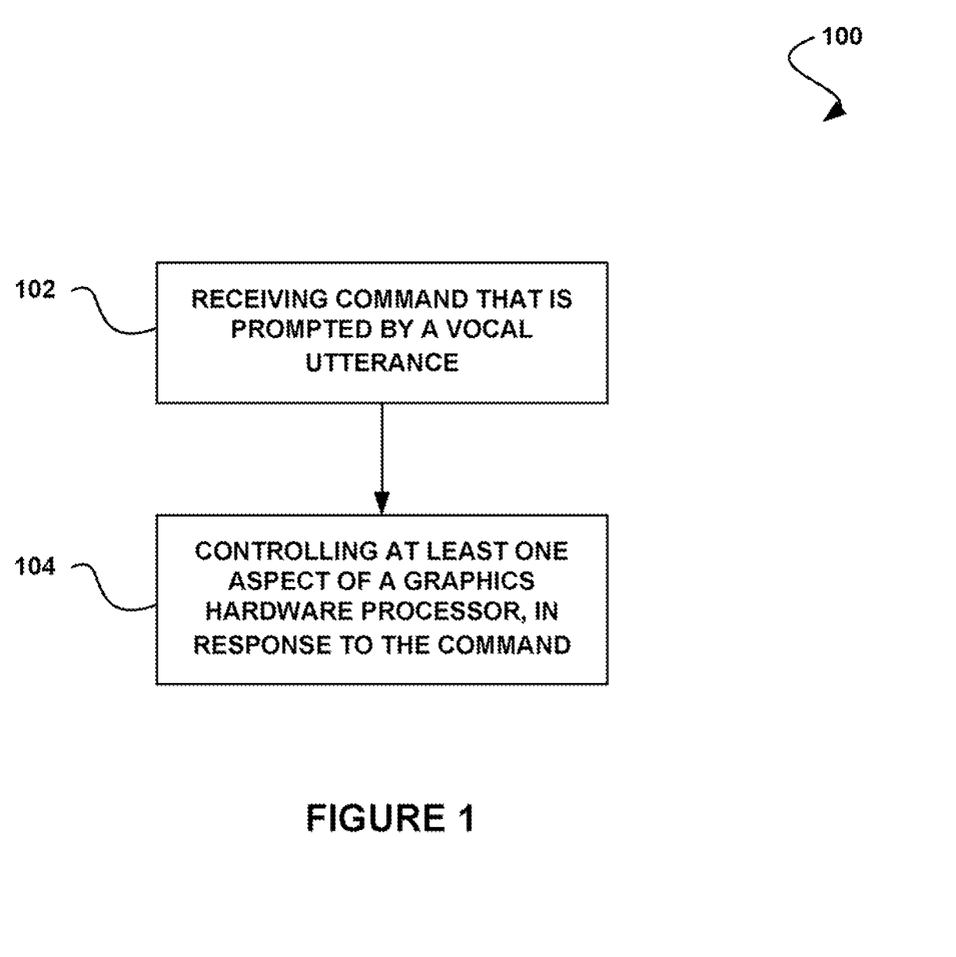
FIG. 1 shows a method for voice controlling at least one aspect of a hardware graphics hardware processor, in accordance with one embodiment.

FIG. 1 shows a method 100 for voice controlling at least one aspect of a hardware graphics hardware processor, in accordance with one embodiment. As shown, a command is received that is prompted by a vocal utterance. See operation 102.

In the context of the present description, such command may refer to any code or signal that is prompted by the vocal utterance. Just by way of example, such command may include a textual equivalent of the vocal utterance, an application program interface (API) call, a driver command, etc. More information regarding such exemplary types of commands will be set forth during reference to subsequent figures in the context of different exemplary embodiments.

Still yet, the vocal utterance may refer to any vocalization of a human. For example, such vocal utterance may include a vocal word. In other embodiments, the vocal utterance may simply include a vocal sound that does not necessarily correspond to a word, phrase, etc.

In operation 104, at least one aspect of a graphics hardware processor is controlled, in response to the command. In the context of the present description, the graphics hardware processor refers to any integrated circuit (or portion thereof) dedicated for performing graphics processing. For example, in various embodiments, the graphics hardware processor may include, but is not limited to a graphics processing unit (GPU) with transform/lighting capabilities as well as rasterization functionality.

Still yet, the at least one aspect of the graphics hardware processor that is controlled may relate to a display configuration, a video playback configuration, and/or any aspect of the graphics hardware processor, for that matter. For example, control of the aforementioned display configuration may include, but is not limited to control involving a resolution, a refresh rate, a color depth, a multi-display configuration (e.g. a single display mode, a clone mode, a dual view mode, etc.), an active display selection (e.g. CRT/DVI/LCD, etc.), an overscan compensation (e.g. HDTV overscan compensation, etc.), a display rotation (e.g. landscape, portrait, etc.), a scaling mode (e.g. centered scaling, monitor scaling, graphics processor scaling, etc.), a zoom feature (e.g. zoom in, zoom out, etc.), etc.

Still yet, control of the aforementioned video playback configuration may include, but is not limited to control involving color control (e.g. hue, saturation, brightness, contrast, image sharpening, etc.), filtering (e.g. noise reduction, de-interlacing, etc.). Of course, the foregoing aspects are set forth for illustrative purposes only and should not be construed as limiting in any manner whatsoever. Further, depending on the specific aspect being controlled, such control may relate to a modification of a parameter, selection of one of a plurality of modes, activation/deactivation of a feature, and/or any other control, for that matter.

It should be noted that other embodiments are further contemplated for voice control of other hardware processors. For instance, at least one aspect of a central hardware processor or a network hardware processor may be controlled, in response to the command. In the case of a central hardware processor, such aspect may range from a power-saving mode to specific processing capabilities, etc. Further, in the context of the network hardware processor, such aspect may range from a network speed capability to enabling/disabling network connectivity, etc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. For example, while the following examples are set forth in the context of a graphics hardware processor, other hardware processors, as well as other frameworks capable of accomplishing voice control are contemplated. Thus, any of the following features may be optionally incorporated with or without the exclusion of other features described.

Figure 2:
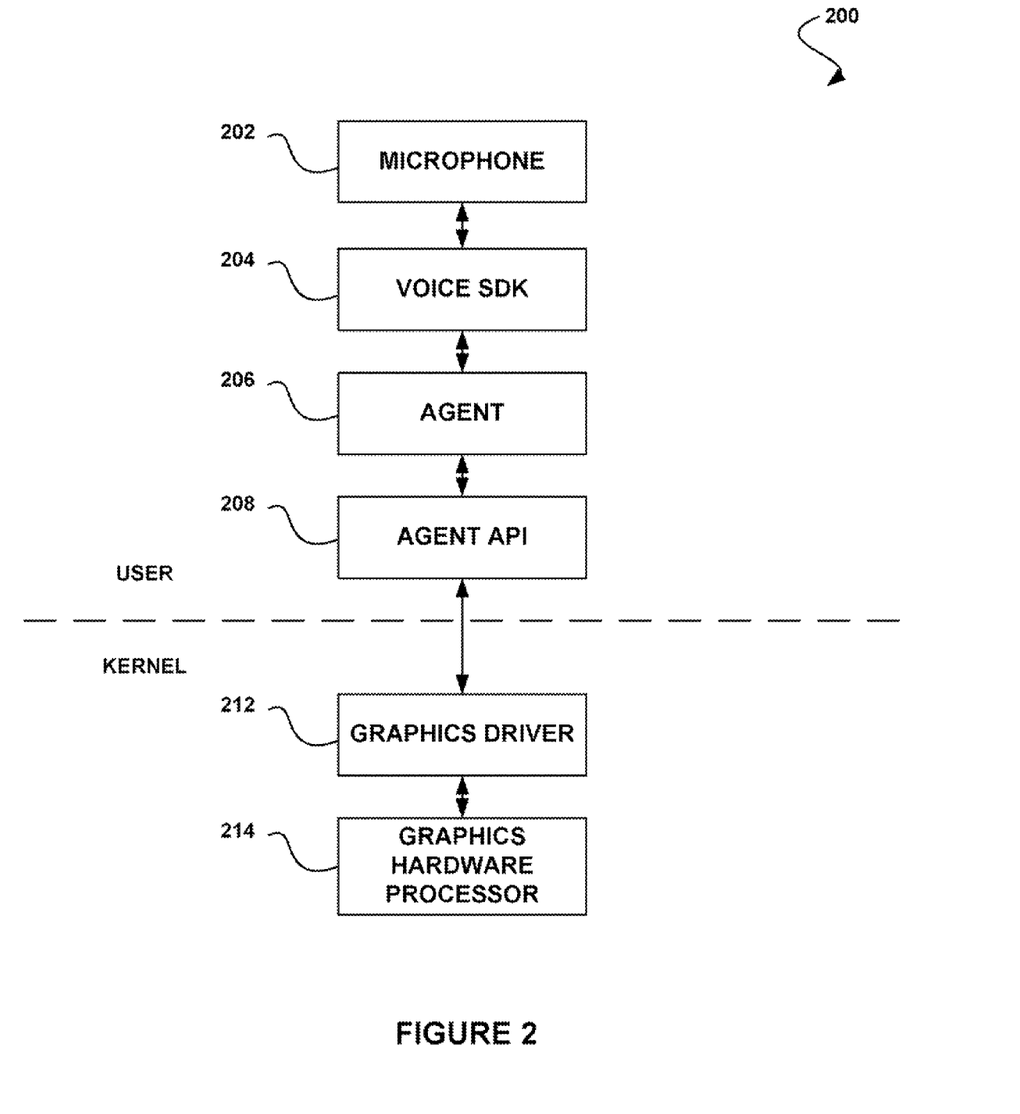
FIG. 2 shows a system for voice controlling at least one aspect of a hardware graphics hardware processor, in accordance with another embodiment.

FIG. 2 shows a system 200 for voice controlling at least one aspect of a hardware graphics hardware processor, in accordance with another embodiment. As an option, the present system 200 may be implemented to carry out the method 100 of FIG. 1. Of course, however, the system 200 may be implemented in any desired environment. Further, the aforementioned definitions equally apply during the description of the present embodiment.

As shown, included is a microphone 202 in communication with a voice software development kit (SDK) 204. Such voice SDK 204 is in communication with an agent 206 which is, in turn, in communication with an agent API 208. The aforementioned components all include user mode modules, where the agent API 208 remains in communication with a graphics driver 212 (e.g. a kernel module, etc.) that interfaces a graphics hardware processor 214.

In use, the microphone 202 is adapted for receiving vocal utterances spoken by a user, and communicating such vocal utterances to the voice SDK 204. During operation, the voice SDK 204 is capable of voice recognition (e.g. speech-to-text, etc.) for converting the vocal utterances to a textual equivalent. For reasons that will soon become apparent, it should be noted that the voice SDK 204 is further capable of converting text to speech, which may be output via a speaker (not shown).

The voice SDK 204 then transfers the text command to the agent 206. The agent 206 serves to implement various logic or rules to control the graphics hardware processor 214 and/or provide information to the user, in response to the text command (in possible combination with tactile input, etc.). The aforementioned information may, in one possible embodiment, be associated with the graphics hardware processor 214, and may be retrieved directly from the graphics hardware processor 214 and/or a separate database. Of course, such information may be fed back to the user via a GUI or via vocal utterances (by way of the text-to-speech capabilities of the voice SDK 204, etc.). More information regarding one exemplary implementation of an agent will be set forth during reference to FIG. 3.

In order for the agent 206 to control the graphics hardware processor 214, the previously mentioned text command may be sent to the agent API 208 for converting the text command to an API call that is capable of being acted upon by the graphics driver 212 in a platform independent manner. Specifically, the graphics driver 212 is adapted for controlling at least one aspect of the graphics hardware processor 214. It should be further noted that the agent API 208 and the graphics driver 212 are each further capable of feeding back any information (e.g. manufacturer of the processor, capabilities, current status of any aspect of operation such as a mode, feature, etc.) that is queried. By this feature, a user is capable of vocal control of at least one aspect of the graphics hardware that goes, at least in part, beyond the control of merely software-based aspects of a system.

Figure 3:
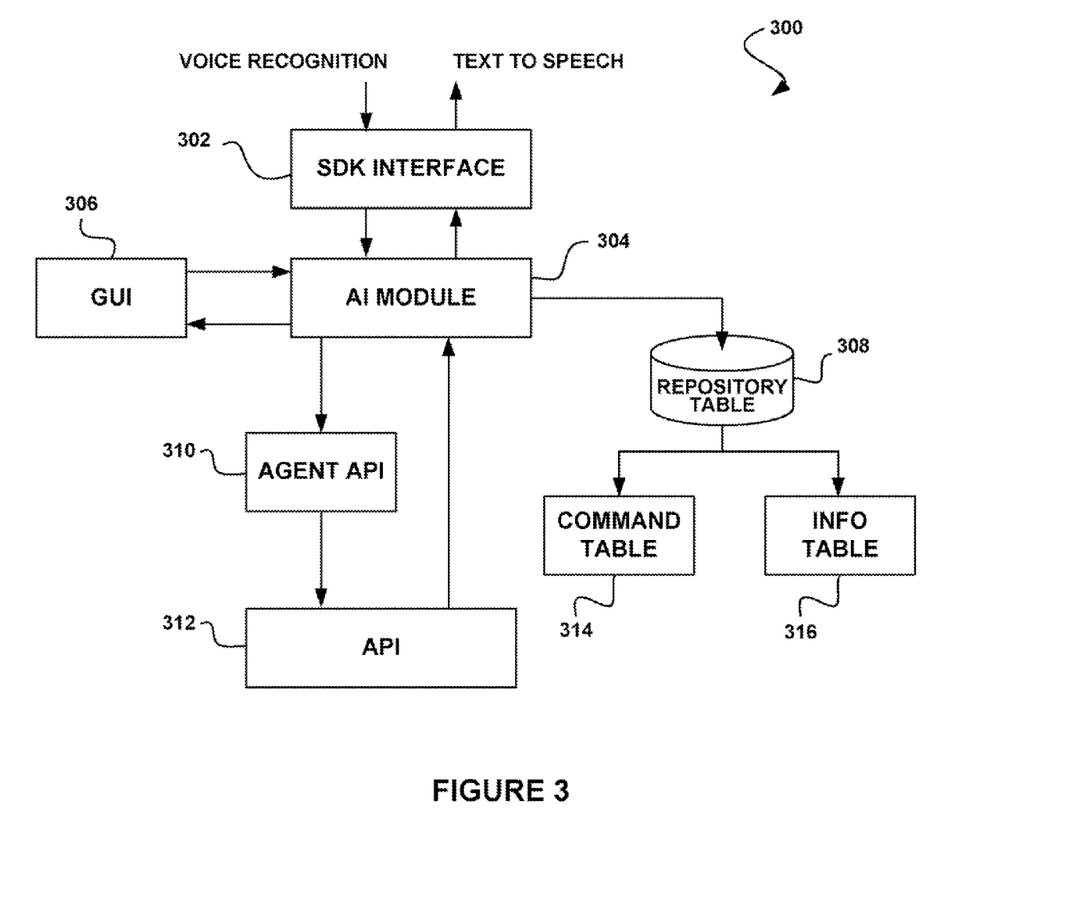
FIG. 3 shows an agent for voice controlling at least one aspect of a hardware graphics hardware processor, in accordance with one embodiment.

FIG. 3 shows an agent 300 for voice controlling at least one aspect of a hardware graphics hardware processor, in accordance with one embodiment. As an option, the present agent 300 may be implemented in the context of the agent 206 of FIG. 2. Of course, however, the agent 300 may be implemented in any desired environment. Further, the aforementioned definitions equally apply during the description of the present embodiment.

As shown, included is an SDK interface 302 for interfacing a voice SDK (e.g. voice SDK 204 of FIG. 2, etc.) and receiving text commands from the voice SDK as well as delivering text thereto for being outputted via a speaker. The SDK interface 302 further remains in communication with an artificial intelligence (AI) module 304 that remains in communication with a speaker (not shown), a GUI 306, and a repository table 308.

Such repository table 308 may include, but is not limited to a list of acceptable textual commands as well as various information that may be output under various conditions. See items 314 and 316. Non-exhaustive examples of textual commands include, but are not limited to "What kind of GPU do I have?," "Reset display," "Change refresh rate," "Set clone," "Set underscan," "Add a new mode," etc. The AI module 304 is further in communication with an agent API 310 (e.g. agent API 208 of FIG. 2, etc.), such that any text commands outputted may be translated to an appropriate API call by the agent API 310.

in use, the AI module 304 operates to respond to received text commands by applying any necessary rule-based logic based on the received text command. Such response may further be a function of other information. For example, such information may optionally be retrieved from the graphics hardware processor in the form of capabilities of the processor, current status of any aspect of operation such as a mode, feature, etc. Additional information may also be requested from the user.

In order to obtain any required additional information from the graphics hardware processor, the AT module 304 may send queries in the repository table 308 to the agent API 310 (which are translated and forwarded to the graphics hardware processor). Further, in order to obtain any required additional information from the user, the AI module 304 may visually and/or audibly prompt the user using text commands from the repository table 308 to the GUI 306 and/or the SDK interface 302 (where the text commands are translated and forwarded to the user to prompt further vocal utterances, etc.). More information regarding one possible way of interfacing with the user will be set forth during the description of FIG. 4. Of course, information may further be queried from other sources other than the user and/or graphics hardware processor, such as a display or any other system component, a central server database via a network, etc.

Armed with the originally received text command and any required information from the graphics hardware processor and/or user, the AI module 304 is capable applying any necessary logic in order to send additional textual commands to the agent API 310 for controlling the graphics hardware processor in the desired manner. Also, additional information may be fed back to the user various purposes (e.g. providing updated status, confirm execution of command, etc.). Various examples of voice controlling a hardware graphics hardware processor will now be set forth.

In one example, a user may want to change a resolution being supported by the graphics hardware processor. In such example, the user may say "Change resolution," after which the present agent 300 may first query the graphics hardware processor to identify a make/model thereof which, in turn, can be used to confirm that a change is resolution is supported. If so, the agent 300 may prompt the user to indicate whether the resolution should be changed "higher" or "lower." In response to one of such commands, the graphics hardware processor may be controlled to raise or lower the supported resolution. Of course, the agent 300 may also be adapted to forgo the user prompt in the case where more information is initially provided (e.g. a vocal command "Change resolution to be higher" is received, etc.).

In another example involving a multi-display environment, a user may want to expand control from a single display environment to a dual display environment. In such scenario, the user may say "Dual display," after which the present agent 300 may first query the graphics hardware processor to identify a make/model thereof which, in turn, can be used to confirm that such mode is possible. If not, the agent 300 may indicate such to the user. If so, however the agent 300 may control the graphics hardware processor to switch to a dual mode of operation.

In still yet another embodiment, a user may desire to activate a graphics hardware processor that has "timed out" and has therefore "blacked out" an associated display. In such embodiment, the user may simply say "Activate." after which the present agent 300 may simply activate the graphics processor. It should be strongly noted that the foregoing examples of use are set forth strictly for illustrative purposes only and should not be construed as limiting in any manner.

Figure 4:
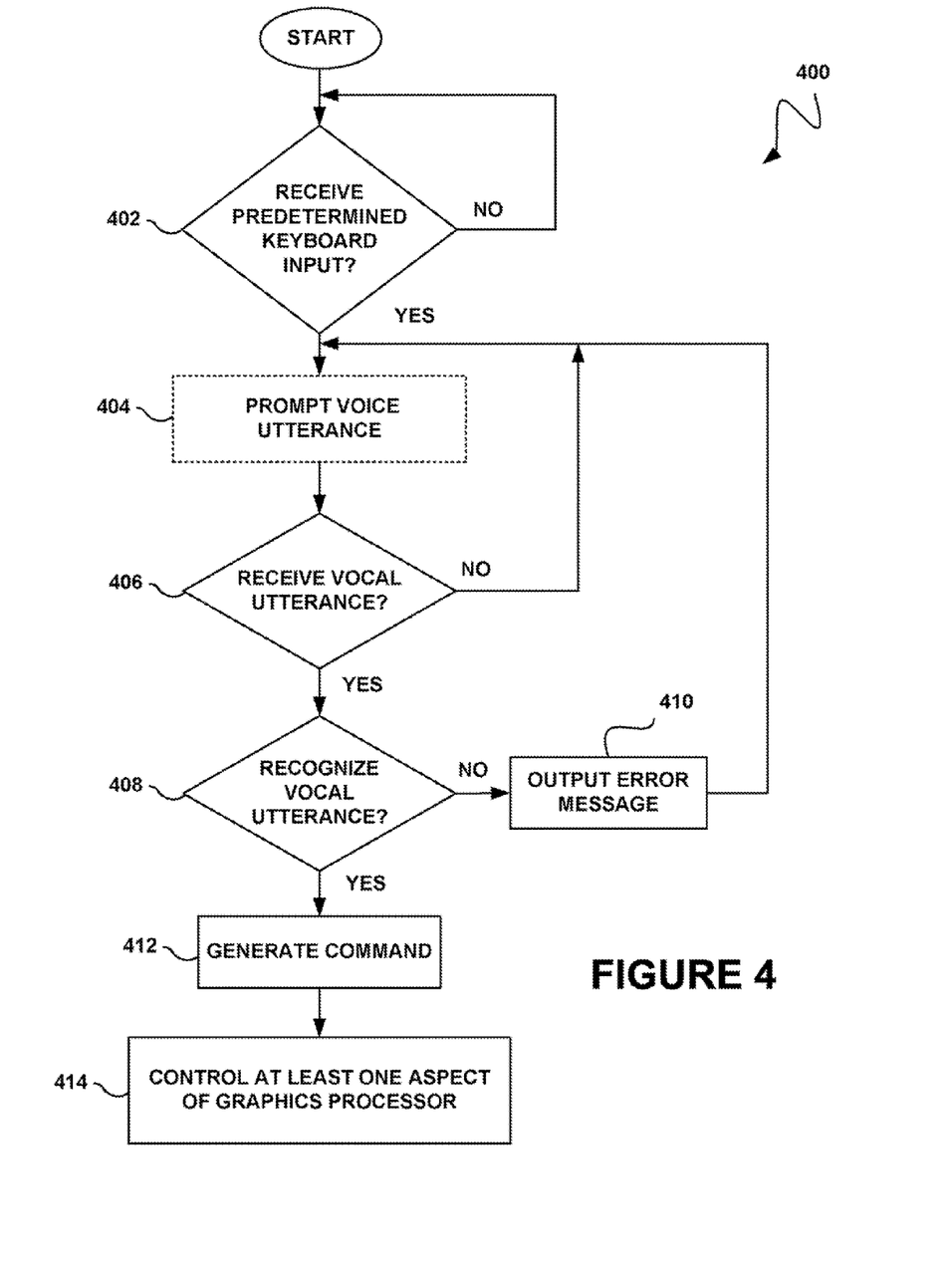
FIG. 4 shows a method for voice controlling at least one aspect of a hardware graphics hardware processor, in accordance with another embodiment.

FIG. 4 shows a method 400 for voice controlling at least one aspect of a hardware graphics hardware processor, in accordance with another embodiment. As an option, the present method 400 may be implemented in the context of the functionality and architecture of FIGS. 1-3. Of course, however, the method 400 may be carried out in any desired environment. Further, the aforementioned definitions equally apply during the description of the present embodiment.

As shown, it is first determined whether a predetermined tactile input is received. See decision 402. For example, such predetermined tactile input may refer to the depression of a predetermined key on a keyboard, a mouse click on a portion of a GUI, etc.

Upon receipt of such predetermined tactile input, a user may optionally be prompted for inputting a vocal utterance via an appropriate voice input mechanism (e.g. the microphone 202 of FIG. 2, etc.). See operation 404. Of course, such operation 404 may be omitted in other embodiments. Further, such prompt may be visual and/or audible in nature. Strictly as an option, the prompt may list acceptable vocal utterances along with any other desired instructions.

Further, in one embodiment, the vocal utterance may only be allowed upon and during the continued receipt of the tactile input. For example, the user may be only allowed to enter the vocal utterance in conjunction with a predetermined key being continually depressed. Other embodiments are also contemplated where such feature is not necessary.

It is then determined whether the vocal utterance has been received. See decision 406. If so, it is then determined whether the vocal utterance was recognizable. Note decision 406. In one embodiment, this may be accomplished utilizing a speech recognition system (e.g. the SDK 204 of FIG. 2, etc.).

If, for any reason, the vocal utterance is incapable of being recognized, an error message may be outputted, per operation 410. Similar to the voice prompt of optional operation 404, such error message may be visual and/or audible in nature.

Also similar to the prompt of operation 404, the error message may include the list of acceptable vocal utterances along with any other desired instructions.

If however, the received vocal utterance is recognized, an associated command is generated. Note operation 412. Again, such command may include, but is not limited to simply a textual equivalent of the vocal utterance, an API call selected based on the recognized vocal utterance, etc. In response to such command, at least one aspect of the graphics hardware processor may be controlled in response to the command in operation 414. In addition, information may be fed back to the user, in further response to the command. In one embodiment, operations 412-414 may be carried out utilizing an agent (e.g. the agent 206 of FIG. 2, etc.).

It should be strongly noted that the foregoing flow is set forth for illustrative purposes only and should not be construed as limiting in any manner. For example, embodiments are contemplated with or without different tactile input and/or visual/audible output.

Figure 5:
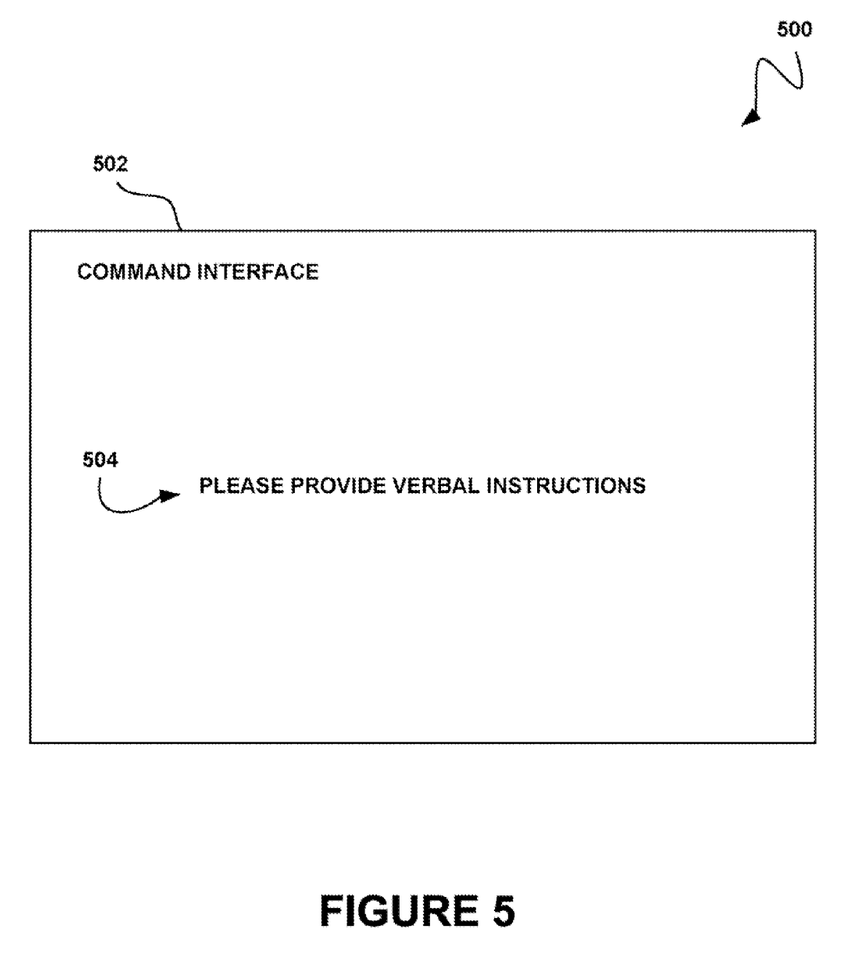
FIG. 5 illustrates a graphical user interface (GUT) adapted for prompting a user to input a vocal utterance for controlling at least one aspect of a hardware graphics hardware processor, in accordance with another embodiment.
Figure 6:
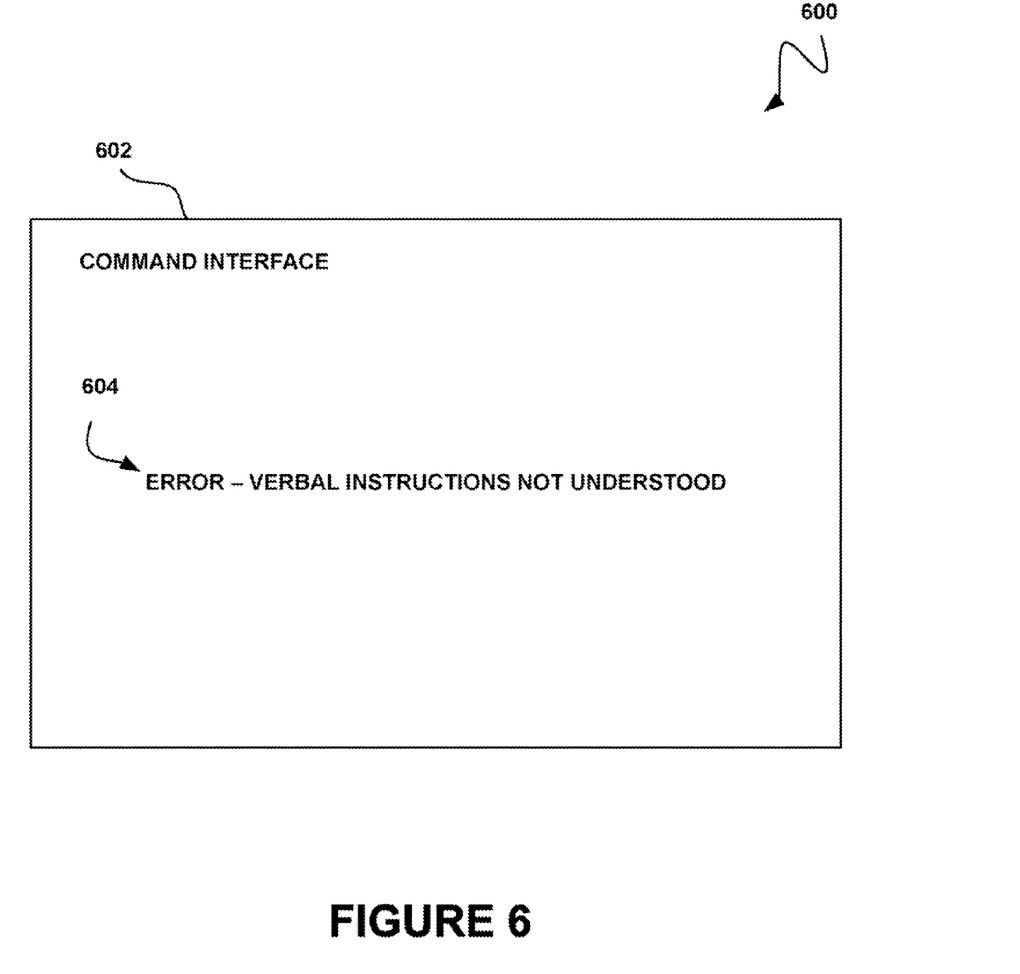
FIG. 6 illustrates a GUI adapted for indicating to a user that a received vocal utterance was not recognizable, in accordance with another embodiment.
Figure 7:
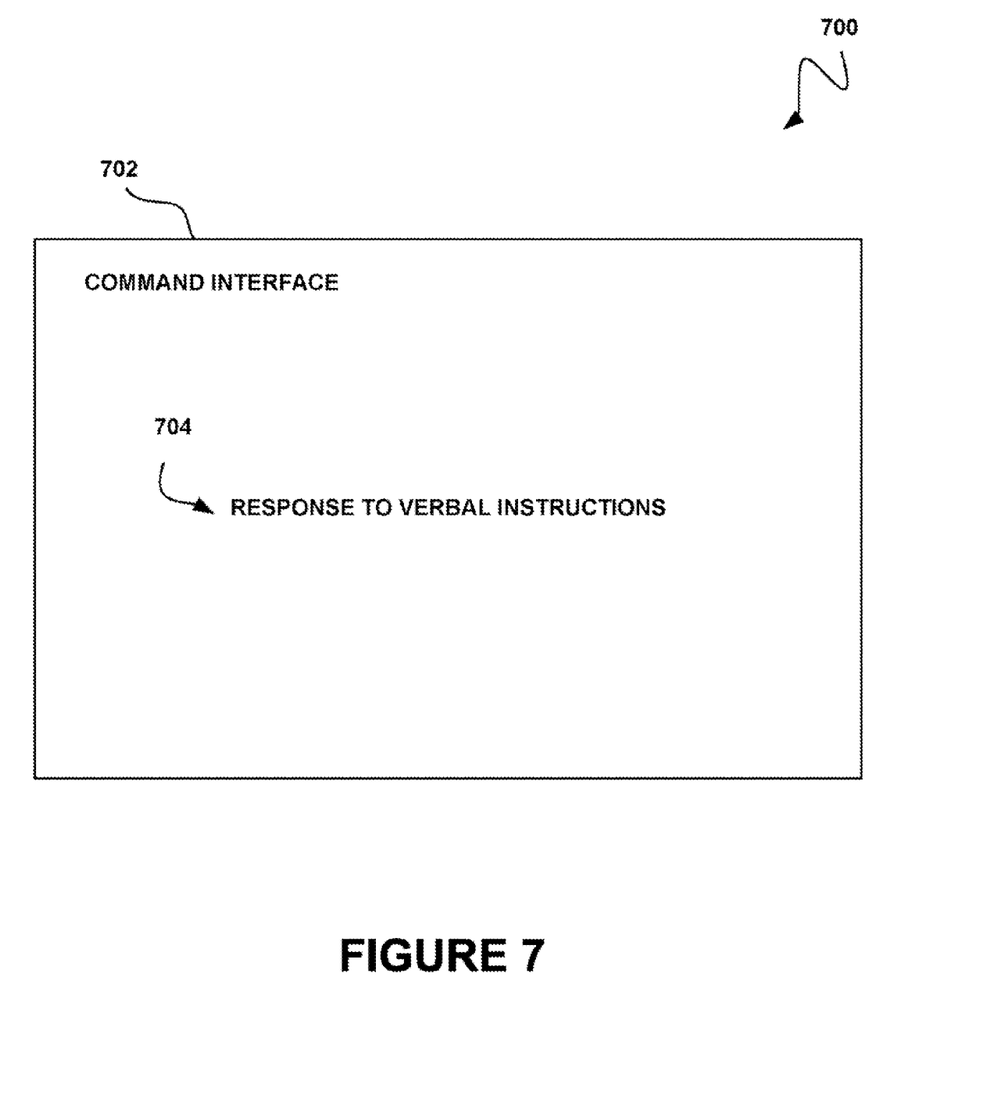
FIG. 7 illustrates a GUI adapted for providing a user with information in response to a command prompted by a voice utterance, in accordance with another embodiment.

FIGS. 5-7 illustrate a plurality of GUIs 500, 600, 700 adapted for use in conjunction with voice controlling at least one aspect of a hardware graphics hardware processor, in accordance with another embodiment. As an option, the present GUIs 500, 600, 700 may be used in the context of the functionality of the method 400 of FIG. 4. In one embodiment, the content of such GUIs 500, 600, 700 may be implemented in the form of a single interface (e.g. animation, etc.) for facilitating voice control of the graphics hardware processor. Of course, however, embodiments are envisioned without one or more of such GUIs 500, 600, 700, as well as with embodiments where an audible equivalent is outputted instead of or in addition to the GUIs 500, 600, 700.

FIG. 5 illustrates a GUI 500 adapted for prompting a user to input a vocal utterance for controlling at least one aspect of a hardware graphics hardware processor, in accordance with another embodiment. As shown, a command interface 502 is included which provides a prompt 504 to a user to vocalize an instruction. In one embodiment, such interface may be outputted in conjunction with operation 404 of FIG. 4.

FIG. 6 illustrates a GUI 600 adapted for indicating to a user that a received vocal utterance was not recognizable, in accordance with another embodiment. As shown, a command interface 602 is included which provides an error message 604 indicating that a vocal utterance was not recognized. In one embodiment, such interface may be outputted in conjunction with operation 410 of FIG. 4.

FIG. 7 illustrates a GUI 700 adapted for providing a user with information in response to a command prompted by a voice utterance, in accordance with another embodiment. As shown, a command interface 702 is included which provides information 704 to a user. In one embodiment such interface may be outputted in conjunction with operation 414 of FIG. 4.

Figure 8:
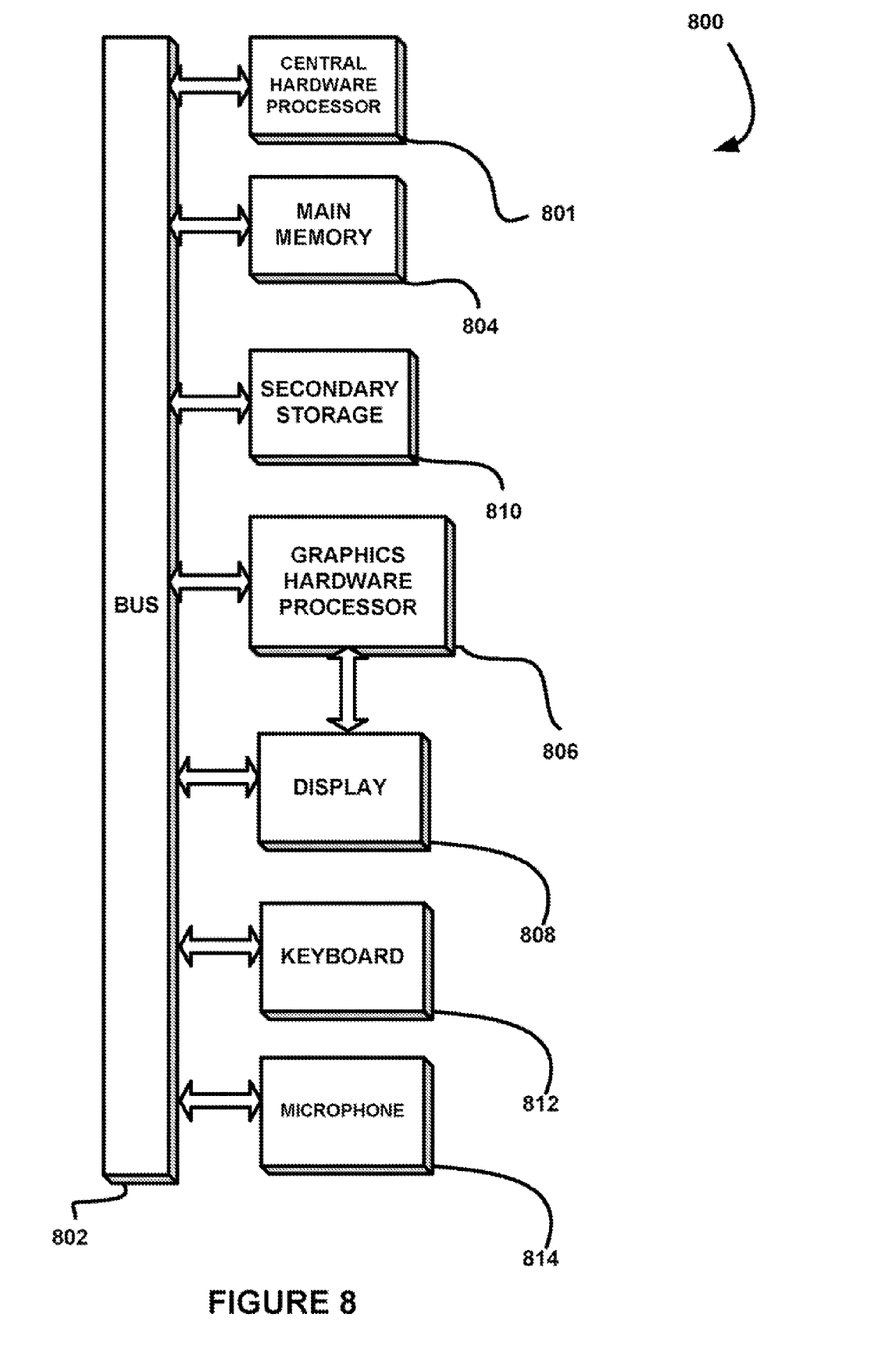
FIG. 8 illustrates an exemplary computer system in which the architecture and/or functionality of the various previous embodiments may be implemented.

FIG. 8 illustrates an exemplary computer system 800 in which the architecture and/or functionality of the various previous embodiments may be implemented. As shown, a computer system 800 is provided including at least one host processor 801 which is connected to a communication bus 802. The computer system 800 also includes a main memory 804. Control logic (software) and data are stored in the main memory 804 which may take the form of random access memory (RAM).

The computer system 800 also includes a graphics hardware processor 806 and a display 808, i.e. a computer monitor. In one embodiment, the graphics hardware processor 806 may include a plurality of vertex/pixel shader modules, a rasterization module, etc. Each of the foregoing modules may even be situated on a single semiconductor platform to form a graphics processing unit (GPU). In one optional embodiment, the graphics hardware processor 806 may include a plurality of programmable features (e.g. programmable shaders, etc.) each of which may be under voice control.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the computer system 800 to perform various functions. Memory 804, storage 810 and/or any other storage are possible examples of computer-readable media.

In one embodiment, the architecture and/or functionality of the various previous figures may be implemented in the context of the host processor 801, graphics hardware processor 806, an integrated circuit (not shown) that is capable of at least a portion of the capabilities of both the host processor 801 and the graphics hardware processor 806, a chipset (i.e. a group of integrated circuits designed to work and sold as a unit for performing related functions, etc.), and/or any other integrated circuit for that matter. For example, a network hardware processor (not shown) may be provided which off-loads network processing from another processor, where such processing is under voice control. One example of a network hardware processor is a transport offload engine (TOE).

In order to provide the necessary functionality of the various previous figures, the computer system 800 may further include a microphone 814 in communication with the other components via the bus 802. Still yet, a keyboard 812 (as well as any other desired input/output device, etc.) may also be provided.

Still yet, it should be noted that the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    receiving, at an agent, a command that is prompted by a vocal utterance, wherein the agent is a first user mode module of a system, and wherein the agent receives the command from a voice recognition application that is a second user mode module of the system and that converts the vocal utterance to the command;
    retrieving, by the agent, first information from a graphics hardware processor in response to the command prompted by the vocal utterance, the first information including at least one of a capability of the graphics hardware processor and a status of an aspect of operation of the graphics hardware processor, wherein the first information is retrieved by the agent by:
        sending a query to the graphics hardware processor for the first information in response to the command; and
        receiving the first information from the graphics hardware processor as a result of the query;
    controlling, by the agent, at least one aspect of the graphics hardware processor, in response to the command and based on the first information retrieved from the graphics hardware processor; and
    outputting second information associated with the graphics hardware processor, in response to the command and based on the first information retrieved from the graphics hardware processor;
    wherein the vocal utterance includes a vocalized instruction to change a configuration of at least one of a display and a video playback.

2. The method of claim 1, wherein the vocal utterance is received in conjunction with a tactile input.

3. The method of claim 2, wherein the tactile input includes keyboard input.

4. The method of claim 1, wherein the graphics hardware processor includes a graphics processing unit.

5. The method of claim 1, wherein the at least one aspect of the graphics hardware processor relates to a display configuration.

6. The method of claim 1, wherein the control of the at least one aspect of the graphics hardware processor involves at least one of a resolution, a refresh rate, a color depth, a multi-display configuration, a signal display mode, a clone mode, a dual view mode, an active display selection, an overscan compensation, a display rotation, a scaling mode, and a zoom feature.

7. The method of claim 1, wherein the at least one aspect of the graphics hardware processor relates to a video playback configuration.

8. The method of claim 1, wherein the control of the at least one aspect of the graphics hardware processor involves at least one of color control and filtering.

9. The method of claim 1, wherein the second information indicates at least one of a manufacturer of the graphics hardware processor and a current status of the operation of the graphics hardware processor.

10. The method of claim 1, wherein the second information is received from a database.

11. The method of claim 1, wherein the second information is received from the graphics hardware processor.

12. The method of claim 1, wherein the second information is outputted utilizing a graphical user interface.

13. The method of claim 1, wherein the second information is outputted utilizing a vocal utterance.

14. The method of claim 1, and further comprising translating the vocal utterance into a textual command.

15. The method of claim 14, and further comprising translating the textual command into an application program interface (API) call.

16. The method of claim 15, and further comprising sending the API call to a driver associated with the graphics hardware processor for controlling the at least one aspect of the graphics hardware processor.

17. The method of claim 1, wherein at least one other query is sent to an agent API and is translated and forwarded to the graphics hardware processor by the agent API in order to obtain the second information associated with the graphics hardware processor.

18. The method of claim 17, wherein the agent API is a third user mode module that is in communication with a kernel mode graphics driver that interfaces with the graphics hardware processor.

19. The method of claim 1, wherein the vocal utterance comprises a vocal command to change a resolution supported by the graphics hardware processor.

20. The method of claim 1, wherein the vocal utterance includes the vocalized instruction to change the configuration of the display.

21. The method of claim 1, wherein the vocal utterance includes the vocalized instruction to change the configuration of the video playback.

22. The method of claim 1, wherein the vocal utterance includes a request for a change in a resolution from a user, and the retrieving first information includes querying the graphics hardware processor to identify a make and a model of the graphics hardware processor in response to the request for the change in resolution, wherein it is determined based on the identified make and the identified model of the graphics hardware processor that the change in resolution is supported, and the outputting second information includes prompting the user to indicate whether the resolution should be changed to a higher resolution or a lower resolution based on the determination that the change in resolution is supported, and wherein the controlling at least one aspect of the graphics hardware processor includes, in response to a subsequent vocal command to raise the resolution from the user, raising the resolution of the graphics hardware processor to the supported higher resolution.

23. The method of claim 1, wherein the vocal utterance includes a request from a user to expand control from a single display environment to a dual display environment, and the retrieving first information includes querying the graphics hardware processor to identify a make and a model of the graphics hardware processor in response to the request to expand control from the single display environment to the dual display environment, wherein it is determined based on the identified make and the identified model of the graphics hardware processor that the dual display environment is available, and the outputting second information includes transmitting an indication to the user indicating that expansion to the dual display environment is supported, and wherein the controlling at least one aspect of the graphics hardware processor includes expanding control from the single display environment to the dual display environment.

24. The method of claim 1, wherein the vocal utterance includes a request from a user to activate the graphics hardware processor after the graphics hardware processor has timed out and has blacked out a display, and the controlling at least one aspect of the graphics hardware processor includes activating the graphics hardware processor in response to the vocal utterance including the request to activate the graphics hardware processor.

25. The method of claim 1, wherein the query is stored in a repository table, such that the agent sends the query in the repository table to the graphics hardware processor.

26. A computer program product embodied on a non-transitory computer readable medium, the computer program product including instructions which, when executed by a processor, cause the processor to perform a method comprising:

receiving, at an agent, a command that is prompted by a vocal utterance, wherein the agent is a first user mode module of a system, and wherein the agent receives the command from a voice recognition application that is a second user mode module of the system and that converts the vocal utterance to the command;

retrieving, by the agent, first information from at least one of a graphics hardware processor, a central hardware processor, and a network hardware processor in response to the command prompted by the vocal utterance, the first information including at least one of a capability of the at least one of the graphics hardware processor, the central hardware processor, and the network hardware processor, and a status of an aspect of operation of the at least one of the graphics hardware processor, the central hardware processor, and the network hardware processor, wherein the first information is retrieved by the agent by:

sending a query to the at least one of the graphics hardware processor, the central hardware processor, and the network hardware processor for the first information in response to the command; and receiving the first information from the at least one of the graphics hardware processor, the central hardware processor, and the network hardware processor as a result of the query;

controlling, by the agent, at least one aspect of the at least one of the graphics hardware processor, the central hardware processor, and the network hardware processor, in response to the command and based on the first information retrieved from the at least one of the graphics hardware processor, the central hardware processor, and the network hardware processor; and outputting second information associated with the at least one of the graphics hardware processor, the central hardware processor, and the network hardware processor, in response to the command and based on the first information retrieved from the at least one of the graphics hardware processor, the central hardware processor, and the network hardware processor;

wherein the vocal utterance includes a vocalized instruction to change a configuration of at least one of a display and a video playback.

27. A system, comprising:

an agent in communication with a driver, wherein the agent is a first user mode module of a system, the agent for:

receiving a command that is prompted by a vocal utterance, wherein the agent receives the command from a voice recognition application that is a second user mode module of the system and that converts the vocal utterance to the command;

retrieving first information from a graphics hardware processor in response to the command prompted by the vocal utterance, the first information including at least one of a capability of the graphics hardware processor and a status of an aspect of operation of the graphics hardware processor, wherein the first information is retrieved by the agent by:

sending a query to the graphics hardware processor for the first information in response to the command; and receiving the first information from the graphics hardware processor as a result of the query, controlling at least one aspect of the graphics hardware processor, in response to the command prompted by the vocal utterance and based on the first information retrieved from the graphics hardware processor, and outputting second information associated with the graphics hardware processor, in response to the command and based on the first information retrieved from the graphics hardware processor;

wherein the vocal utterance includes a vocalized instruction to change a configuration of at least one of a display and a video playback.

28. The system of claim 27, wherein the graphics hardware processor is in communication with memory via a bus.

* * * * *